United States Patent [19]
Rehfeld

[11] Patent Number: 5,346,038
[45] Date of Patent: Sep. 13, 1994

[54] KINETIC ENERGY ELEVATOR SYSTEMS

[76] Inventor: Kurt R. Rehfeld, P.O. Box 274, Rescue, Calif. 95672

[21] Appl. No.: 212,124

[22] Filed: Mar. 14, 1994

[51] Int. Cl.$^5$ .............................................. B66B 11/04
[52] U.S. Cl. ................................................... 187/17
[58] Field of Search ................................. 187/17, 110

[56] References Cited

U.S. PATENT DOCUMENTS

| | | | |
|---|---|---|---|
| 4,807,724 | 2/1989 | Martin | 187/17 X |
| 5,014,824 | 5/1991 | Fargo | 187/17 |
| 5,238,087 | 8/1993 | Garrido et al. | 187/17 |

Primary Examiner—Robert P. Olszewski
Assistant Examiner—Dean A. Reichard
Attorney, Agent, or Firm—Michael J. Colitz, Jr.

[57] ABSTRACT

A kinetic energy system for raising and lowering an elevator with pneumatic and hydraulic fluids. The elevator has a platform with a downwardly projecting shaft and a casing for receiving the shaft. A vertically extending control chamber has a vertically reciprocal piston with a supply of hydraulic fluid beneath the piston and a supply of pneumatic fluid above the piston. The piston is movable as a function of the pressure of the pneumatic fluid above the piston. A hydraulic fluid storage tank is coupled to the casing and the control chamber. Hydraulic fluid lines couple the bottom of the control chamber with the casing. Also included are a pneumatic fluid pressure tank, a compressor, a pneumatic fluid-receiving tank, and controls interrelated to effect the desired movements of the platform.

3 Claims, 4 Drawing Sheets

KINETIC ENERGY ELEVATOR SYSTEMS

BACKGROUND OF THE INVENTION

1. Field of the Invention

The present invention relates to kinetic energy elevator systems and more particularly pertains to systems for controlling elevators through hydraulic and pneumatic fluids with kinetic as well as potential energy.

2. Description of the Prior Art

The use of elevators and their controls is known in the prior art. More specifically, elevators and their controls heretofore devised and utilized for the purpose of moving elevators are known to consist basically of familiar, expected and obvious structural configurations, notwithstanding the myriad of designs encompassed by the crowded prior art which have been developed for the fulfillment of countless objectives and requirements.

Various approaches have been described in the prior art for controlling elevators. Note for example, U.S. Pat. No. 4,761,953 to Rossman which is directed to a hydraulic elevator mechanism.

U.S. Pat. No. 4,149,382 to Holsomback is directed to hydraulic elevator power assembly.

In addition, various techniques are used for improving the efficiency of hydraulic power sources. Note U.S. Pat. Nos. 5,058,538 to Erickson; 4,188,787 to Bromell and 5,022,359 to Erickson.

In this respect, the kinetic energy elevator systems according to the present invention substantially depart from the conventional concepts and designs of the prior art, and in so doing provide an apparatus primarily developed for the purpose of moving elevators.

Therefore, it can be appreciated that there exists a continuing need for new and improved kinetic energy elevator systems which can be controlled by hydraulics and pneumatic fluids with kinetic as well as potential energy. In this regard, the present invention substantially fulfills this need.

SUMMARY OF THE INVENTION

In view of the foregoing disadvantages inherent in the known types of elevators and controls now present in the prior art, the present invention provides an improved kinetic energy elevator systems. As such, the general purpose of the present invention, which will be described subsequently in greater detail, is to provide new and improved kinetic energy elevator systems apparatus and method which has all the advantages of the prior art and none of the disadvantages.

To attain this, the present invention essentially comprises a kinetic energy elevator system for raising and lowering an elevator employing air and water comprising, in combination an elevator movable in a vertical direction up and down between floors of a building, the elevator having a platform with a downwardly projecting shaft and a casing for receiving the shaft; a vertically extending control chamber with a vertically reciprocal piston, a supply of the water beneath the piston and a supply of air above the piston, the piston being movable as a function of the pressure of the air above the piston; a water storage tank coupled to the casing and the control chamber; water lines coupling the bottom of the control chamber with the casing, such water lines including an up valve to allow the flow of water to the casing and a down valve to allow the flow of water from the casing, the water lines also including a manual valve to shut off the flow of water from the water lines between the water supply tank and the casing; and the water flowing between the casing and the control tank; an air pressure tank with air lines coupled to the top of the control tank to feed air under pressure to the control tank above the piston; a compressor to provide compressed air to the air pressure tank; an air receiving tank coupled to the air lines between coupling the compressor and the air pressure tank; and control means for effecting the flow of water and air between the tanks, chambers and casing to cause the intended non-movement and movement of the elevator upwardly and downwardly.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved kinetic energy elevator systems having all the advantages of the prior art elevators and controls and none of the disadvantages.

It is another object of the present invention to provide new and improved kinetic energy elevator systems which may be easily and efficiently manufactured and marketed.

It is a further object of the present invention to provide new and improved kinetic energy elevator systems which are of a durable and reliable construction.

An even further object of the present invention is to provide new and improved kinetic energy elevator systems which are susceptible of a low cost of manufacture with regard to both materials and labor, and which accordingly is then susceptible of low prices of sale to the consuming public, thereby making such kinetic energy elevator systems economically available to the buying public.

Still yet another object of the present invention is to provide new and improved kinetic energy elevator systems which provide in the apparatuses and methods of the prior art some of the advantages thereof, while simultaneously overcoming some of the disadvantages normally associated therewith.

Still another object of the present invention is to utilize hydraulics and pneumatic fluids along with kinetic as well as potential energy to effect the movement of elevators.

Yet another object of the present invention is to drive an elevator more safely, efficiently and economically.

Even still another object of the present invention is to provide a new and improved kinetic energy elevator system for raising and lowering an elevator employing pneumatic and hydraulic fluids comprising an elevator movable in a vertical direction up and down between floors of a building, the elevator having a platform with a downwardly projecting shaft and a casing for receiving the shaft; a vertically extending control chamber with a vertically reciprocal piston, a supply of the hydraulic fluid beneath the piston and a supply of pneumatic fluid above the piston, the piston being movable as a function of the pressure of the pneumatic fluid above the piston; a hydraulic fluid storage tank coupled to the casing and the control chamber; hydraulic fluid lines coupling the bottom of the control chamber with the casing, such hydraulic fluid lines including an up valve to allow the flow of hydraulic fluid to the casing and a down valve to allow the flow of hydraulic fluid from the casing, the hydraulic fluid lines also including a manual valve to shut off the flow of hydraulic fluid from the hydraulic fluid lines between the hydraulic fluid supply tank and the hydraulic fluid flowing between the casing and the control tank; a pneumatic fluid pressure tank with pneumatic fluid lines coupled to the top of the control tank to feed pneumatic fluid under pressure to the control tank above the piston; a compressor to provide compressed pneumatic fluid to the pneumatic fluid pressure tank; a pneumatic fluid receiving tank coupled to the pneumatic fluid lines between the compressor and the pneumatic fluid pressure tank; and control means for effecting the flow of hydraulic fluid and pneumatic fluid between the tanks, chambers and casing to cause the intended nonmovement and movement of the elevator upwardly and downwardly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
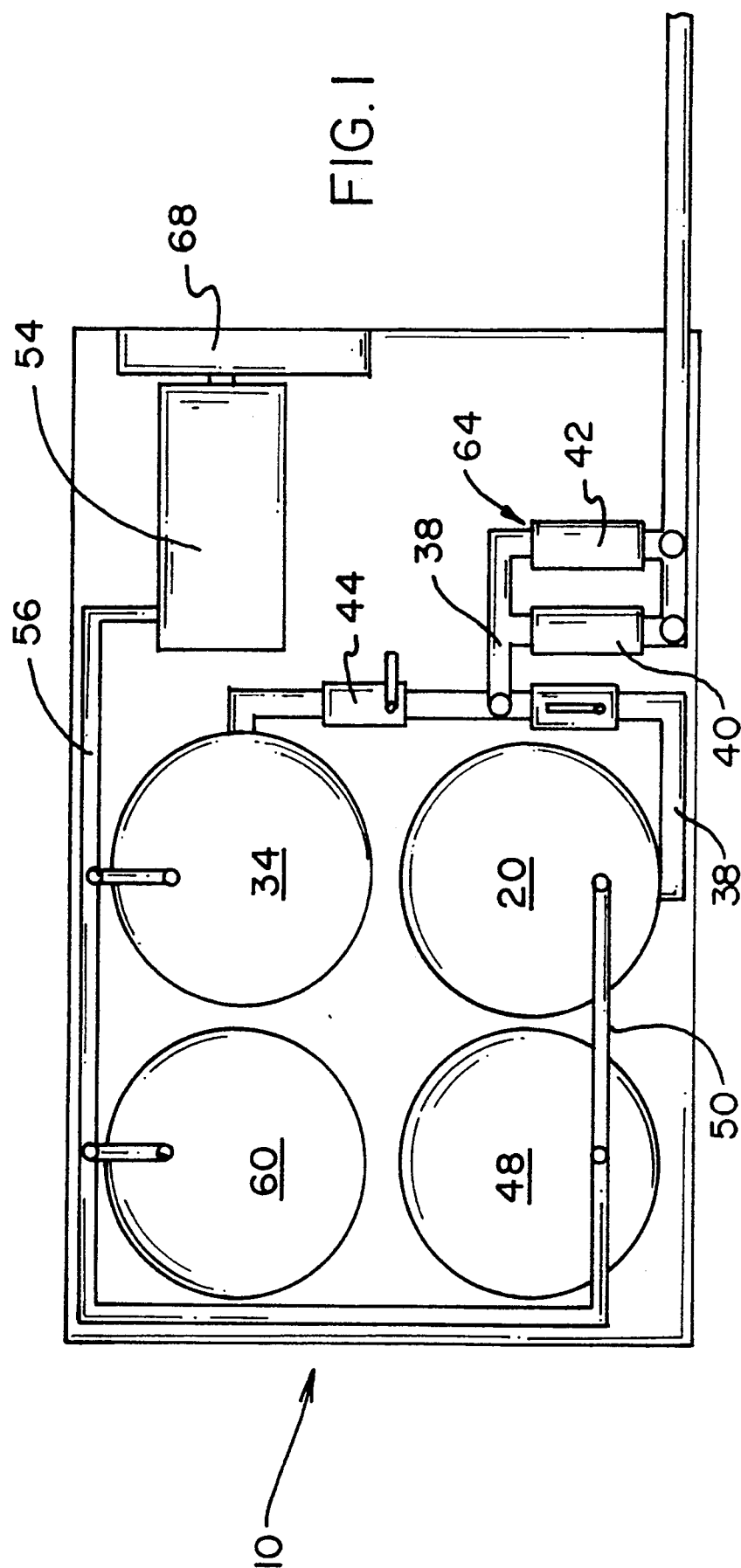
FIG. 1 is a plan view of a kinetic energy elevator systems constructed in accordance with the principles of the present invention.

With reference now to the drawings, and in particular to FIG. 1 thereof, new and improved kinetic energy elevator systems embodying the principles and concepts of the present invention and generally designated by the reference numeral 10 will be described.

Figure 2:
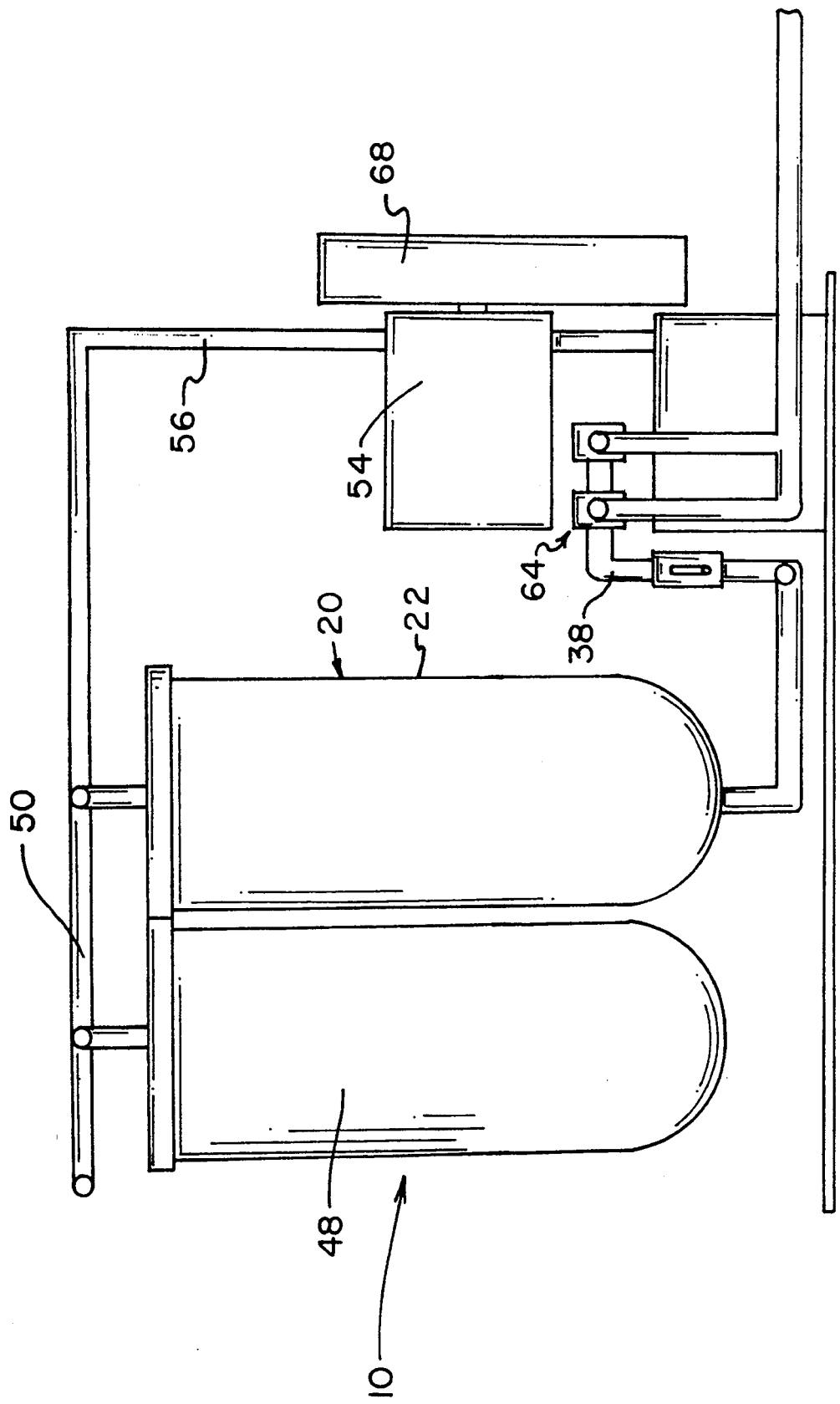
FIG. 2 is a elevational view of the systems shown in FIG. 1.
Figure 3:
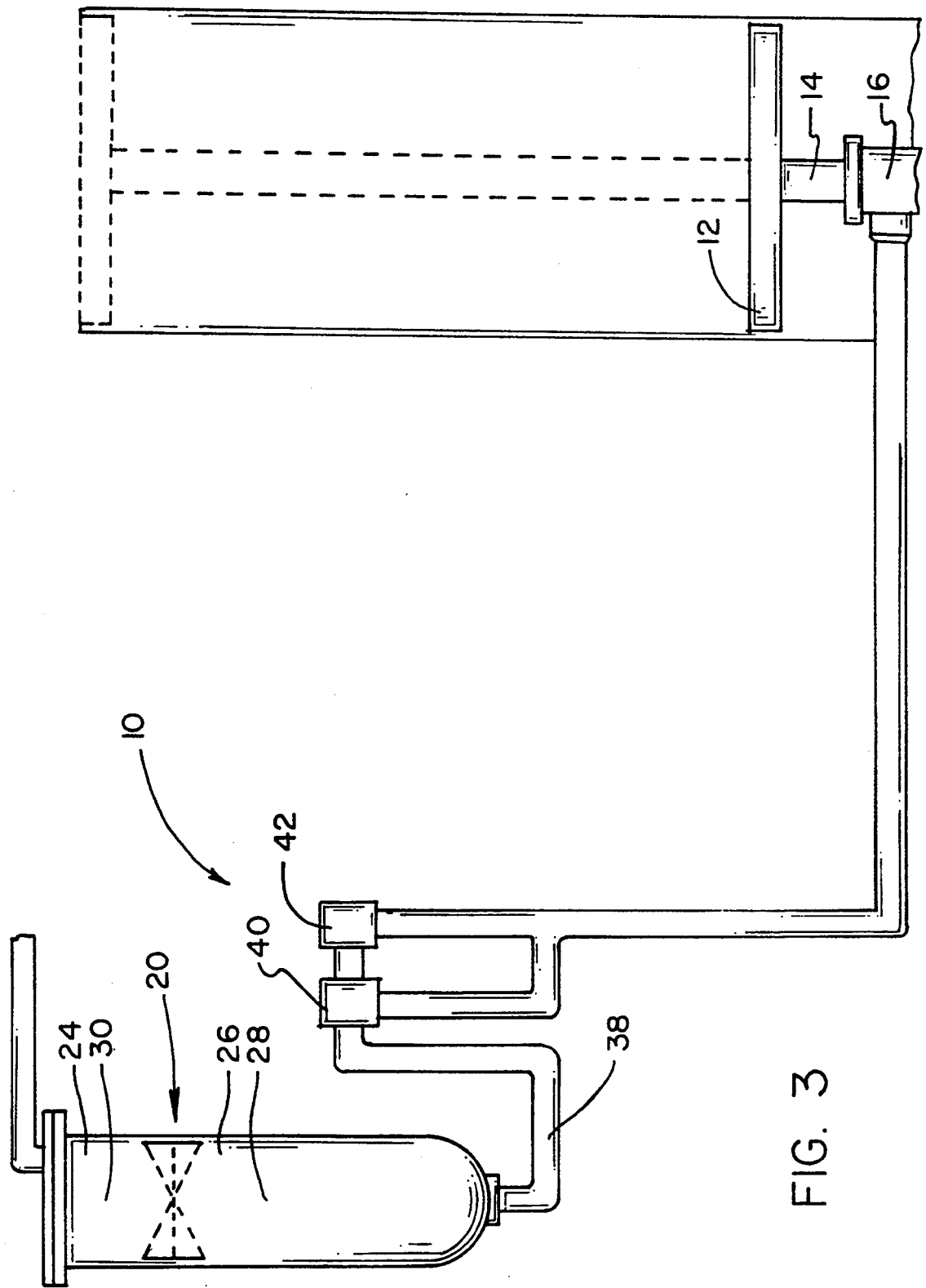
FIG. 3 is an enlarged elevational view of the control chamber and elevator platform of FIGS. 1 and 2.

The system 10 of the invention is most readily understood by reference to FIGS. 1 through 3. The system 10 is a kinetic energy elevator system 10. Such system functions for raising and lowering an elevator. It employs pneumatic fluid, preferably air, a compressible gas, and hydraulic fluid, preferably water, a non-compressible liquid. Such fluids are utilized so as to maximize the efficiency of the system by storing, using, recovering, etc the kinetic and potential energies of the fluids created by the practice of the invention as disclosed herein.

The system is for moving an elevator movable in a vertical direction up and down between floors of a building. The elevator has a platform 12 with a downwardly projecting shaft 14. A casing 16 receives the shaft 14.

Operation of the shaft and platform is through a vertically extending control chamber 20. Such chamber has a vertically reciprocal piston 22 therein to seal the chamber between an upper portion 24 and a lower portion 26. Located in the lower portion 26 is a supply of the water 28. A supply of air 30 is located above the piston. The piston 22 is movable as a function of the pressure of the air above the piston. Although air and water are disclosed as the preferred fluids, the water could be replaced by many other non-compressible fluids, preferably liquids, while the air could be replaced by many other compressible fluids, preferably gasses.

A water storage tank 34 is coupled to the casing 16 and the control chamber 20. See FIGS 1 and 3.

Water lines 38 couple the bottom of the control chamber with the casing. Such water lines including an up valve 40 to allow the flow of water to the casing and a down valve 42 to allow the flow of water from the casing. The water lines also include a manual valve 44 to shut off the flow of water from the water lines between the water storage tank and the casings and the water flowing between the casing and the control tank.

An air pressure tank 48 is also provided. Provided therewith are air lines 50 which couple the air pressure tank with the top of the control tank 20. Such lines function to feed air under pressure to the control tank above the piston.

The system 10 is driven through pressurized air. Such pressure is derived from a compressor 54 which provides and directs compressed air to the air pressure tank 48 through coupling lines 56.

Also located in operative association with the air lines 56 is an air receiving tank 60 operatively coupled between the compressor 54 and the air pressure tank 48.

Operation and control of the system 10 is effected through control means 64. Such control means functions for effecting the flow of water and air between the tanks, chambers and casing. With proper sequencing the control means 64 is effective to cause the intended movement and non-movement of the elevator upwardly and downwardly.

Figure 4:
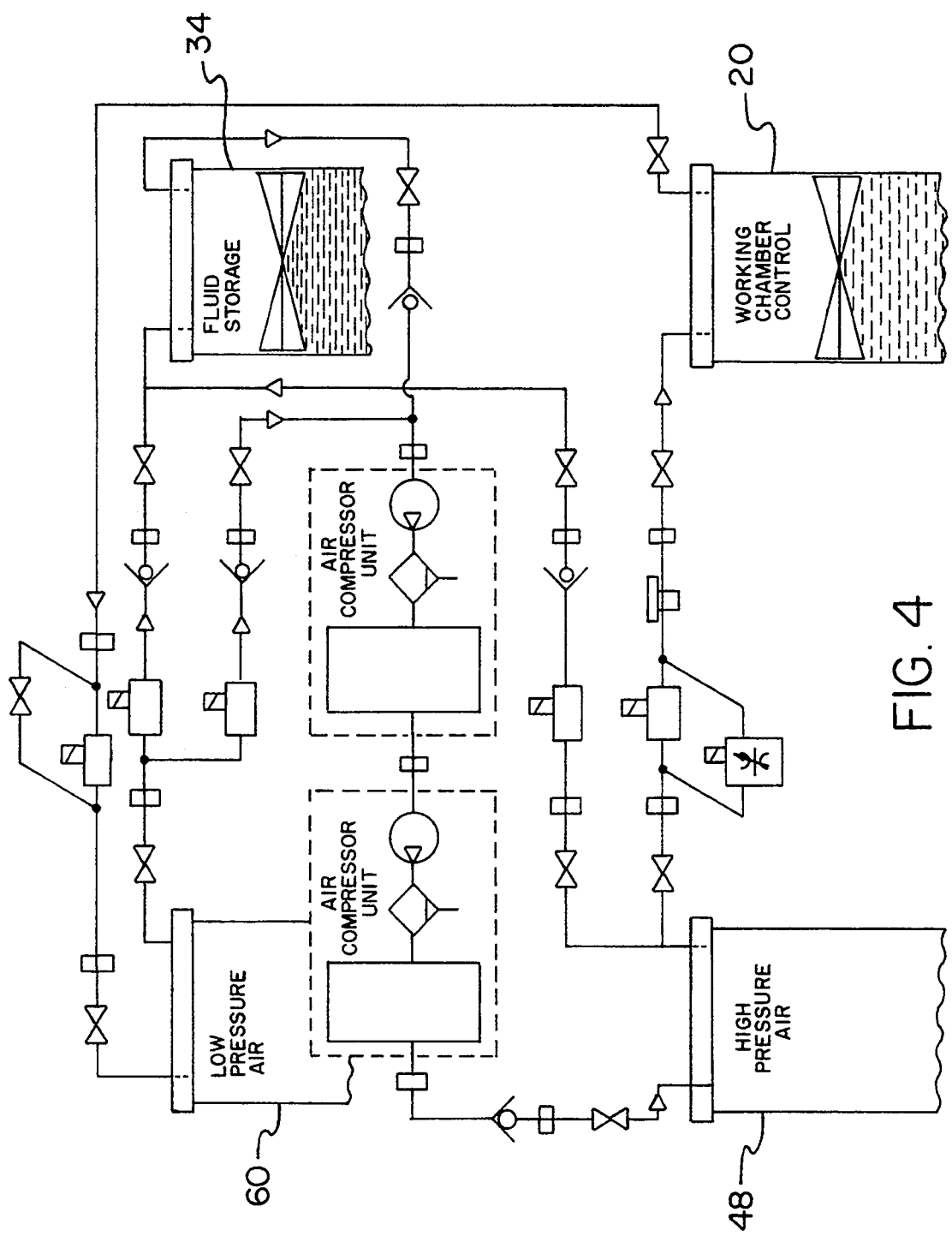
FIG. 4 is a pneumatic layout of the systems of the prior Figures.

Shown in FIG. 4 is a pneumatic layout of the systems of the prior Figures. Using the ASME system of symbols, such Figure includes the following provisions: up and down travel; leveling and stopping; normal, emergency, and/or evacuation; operation; transfer of air pressure; and transfer of hydraulic fluids. No dimensions nor pressure are indicated because of the three variables affecting every elevator: maximum capacity; distance of travel; and car speed. Each chamber is equipped with one or two pressure operated sensor switches, also with a snap-on fitting for the introduction of a pressure gauge.

The controller 68, sensors, solinoid valves, system circuitry and other functioning components allow the successful joining of two powerful and complementary energy sources. The result is a completely automatic elevator with yet one more superior quality: Control over pneumatic and hydraulic forces provides redundancy in safety. Also included is a manual valve control for lowering the elevator in the event of power failure and transfer of hydraulic fluid from storage tank 34 into the working system.

The powerplant of the present invention is for direct plunger hydraulic elevators to provide energy conservation, extend life expectancy of components and be environmentally clean. It is called a kinetic energy elevator because kinetic energy is stored as potential energy for future use.

The present invention uses a closed and pressurized system of pneumatics in combination with hydraulics. The unique control chamber of the present invention is designed to include an internal piston. There is absolute pneumatic control through the use of pressure sensitive switches, regulators, and sensors for maximum safety.

When all safety circuits of the prior art's hydraulic elevator are completed, the pump motor is energized for upward travel. Smooth acceleration and deceleration is achieved by shunting oil back into the oil tank. The pump motor runs at full speed for these functions generating vibration, oil foam, noise, and heat.

The present invention requires pneumatic pressure in the control Chamber to satisfy up travel requirements and the completion of the elevator safety circuits before the up valve can be opened. Once the hydraulic valve is opened, fluid under pressure initiates upward travel. Acceleration and deceleration are controlled only by the hydraulic valve. Vibration, oil foam, noise, and heat have been eliminated.

The conventional hydraulic elevator travels downward under the control of down valves once safety circuits have been completed. Displaced hydraulic fluid, normally oil, is discharged into a non-pressurized reserve tank.

The present invention travels downward only after pneumatic pressure in the control chamber has been properly adjusted, safety circuits have been completed and the down valve is opened. In this instance, the hydraulic fluid, preferably water, is discharged into a sealed container. The pneumatic pressure is stored and recompressed for future use.

The present invention will greatly reduce energy consumption of hydraulic elevators. The principle is the same as electrical regeneration. Water will be used as the hydraulic fluid to eliminate oil costs. The environmental impact of soil contamination by potential petroleum oil leakage will be totally eliminated.

Application of the powerplant of the present invention is for new installations and can be engineered as a retro-fit for existing hydraulic elevators.

With regard to the operation of the present invention, when air pressure in the control chamber above the piston is sensed to be sufficient for the elevator to answer an "up" call and all safety and run circuits are satisfied, the controller will open the "up" valve. The air pressure will force fluid into the casing and the elevator will go up. When the travel is completed the valve will close, the elevator will stop and the doors will open.

To answer a "down call" air pressure in the control chamber must be reduced. When this has been accomplished and all safety circuits and run circuits are completed, the controller will open the down valve. The elevator moves downward forcing fluid back into the chamber and additional air out of the chamber. When the elevator arrives at the designated floor, the down valve will close, the elevator will stop and the door will open.

Safety features of this type of drive are easily made redundant and thus a safer system will be the result.

Regulating air pressures in the key to the kinetic energy elevator. The end product runs cold, generating little heat, and is remarkably efficient.

The Elevator Safety Code and the geographical location may require a safety valve adjacent to the casing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A kinetic energy elevator system for raising and lowering an elevator employing air and water comprising, in combination:
  an elevator movable in a vertical direction up and down between floors of a building, the elevator having a platform with a downwardly projecting shaft and a casing for receiving the shaft;
  a vertically extending control chamber with a vertically reciprocal piston, a supply of the water beneath the piston and a supply of air above the piston, the piston being movable as a function of the pressure of the air above the piston;

a water storage tank coupled to the casing and the control chamber;

water lines coupling the bottom of the control chamber with the casing, such water lines including an up valve to allow the flow of water to the casing and a down valve to allow the flow of water from the casing, the water lines also including a manual valve to shut off the flow of water in the water lines between the water storage tank and the water flowing between the casing and the control tank and the casing;

an air pressure chamber with air lines coupled to the top of the control chamber to feed air under pressure to the control chamber above the piston;

a compressor to provide compressed air via second air lines to the air pressure tank;

an air receiving tank coupled to the second air lines between the compressor and the air pressure tank; and control means for effecting the flow of water and air between the tanks, chambers and casing to cause the intended non-movement and movement of the elevator upwardly and downwardly.

2. A kinetic energy elevator system for raising and lowering an elevator employing pneumatic and hydraulic fluids comprising:

an elevator movable in a vertical direction up and down between floors of a building, the elevator having a platform with a downwardly projecting shaft and a casing for receiving the shaft;

a vertically extending control chamber with a vertically reciprocal piston, a supply of the hydraulic fluid beneath the piston and a supply of pneumatic fluid above the piston, the piston being movable as a function of the pressure of the pneumatic fluid above the piston;

a hydraulic fluid storage tank coupled to the casing and the control chamber;

hydraulic fluid lines coupling the bottom of the control chamber with the casing, such hydraulic fluid lines including an up valve to allow the flow of hydraulic fluid to the casing and a down valve to allow the flow of hydraulic fluid from the casing, the hydraulic fluid lines also including a manual valve to shut off the flow of hydraulic fluid in the hydraulic fluid lines between the hydraulic fluid storage tank and the casing and the hydraulic fluid flowing between the casing and the control chamber;

a pneumatic fluid pressure tank with pneumatic fluid lines coupled to the top of the control chamber to feed pneumatic fluid under pressure to the control chamber above the piston;

a compressor to provide compressed pneumatic fluid via second pneumatic fluid line to the pneumatic fluid pressure tank;

a pneumatic fluid receiving tank coupled to the second pneumatic fluid lines between the compressor and the pneumatic fluid pressure tank; and control means for effecting the flow of hydraulic fluid and pneumatic fluid between the tanks, chamber and casing to cause the intended non-movement and movement of the elevator upwardly and downwardly.

3. The system as set forth in claim 2 and further including solenoid valves for controlling the up and down valves and further include a control panel with controls operatively associated between the control panel and the solenoid valves.

* * * * *